US009642038B2

(12) United States Patent
Narasimha et al.

(10) Patent No.: US 9,642,038 B2
(45) Date of Patent: May 2, 2017

(54) OFFLOADING COMMUNICATION FROM A CELLULAR NETWORK TO A WIRELESS LOCAL AREA NETWORK

(71) Applicant: MOTOROLA MOBILITY LLC, Libertyville, IL (US)

(72) Inventors: Murali Narasimha, Lake Zurich, IL (US); Colin D. Frank, Park Ridge, IL (US); Sandeep H. Krishnamruthy, Mountain View, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 445 days.

(21) Appl. No.: 14/143,153

(22) Filed: Dec. 30, 2013

(65) Prior Publication Data

US 2014/0334293 A1     Nov. 13, 2014

Related U.S. Application Data

(60) Provisional application No. 61/821,810, filed on May 10, 2013.

(51) Int. Cl.
    *H04W 28/08* (2009.01)
    *H04W 24/10* (2009.01)
    (Continued)

(52) U.S. Cl.
    CPC ......... *H04W 28/08* (2013.01); *H04W 24/10* (2013.01); *H04W 36/14* (2013.01); *H04W 74/004* (2013.01)

(58) Field of Classification Search
    CPC .................................................. H04W 28/08
    (Continued)

(56) References Cited

U.S. PATENT DOCUMENTS 5,991,308 A * 11/1999 Fuhrmann ........... H03M 13/256
                                              348/E7.07
7,454,171 B2 * 11/2008 Palin .................... H04L 1/1887
                                              370/328
(Continued)

FOREIGN PATENT DOCUMENTS

| EP | 1542402 A2 | 6/2005 |
| WO | 2012160510 A1 | 11/2012 |
| WO | 2014093910 A2 | 6/2014 |

OTHER PUBLICATIONS

3GPP TSG-RAN2 #81, R2-130051 "WLAN load information for mobility support" Samsung; St. Julian's, Malta; Jan. 28, to Feb. 1, 2013; 3 pages.
(Continued)

*Primary Examiner* — Wei Zhao
(74) *Attorney, Agent, or Firm* — Lerner, David, Littenberg, Krumholz & Mentlik, LLP

(57) ABSTRACT

Disclosed are methods for offloading of communication traffic from a cellular network to a Wireless Local Area Network ("WLAN"). According to various implementations, a wireless device determines a time period during which a wireless channel of the WLAN is busy. This first time period may include multiple channel-busy periods separated by periods during which the channel is not busy. The wireless device determines a second time period that represents interframe spacings associated with the first time period. The wireless device determines a modified channel utilization for the wireless channel based on the first time period and on the second time period. The wireless device reports the modified channel utilization to the cellular network.

17 Claims, 9 Drawing Sheets

(51) Int. Cl.
*H04W 36/14* (2009.01)
*H04W 74/00* (2009.01)

(58) Field of Classification Search
USPC .......................................... 370/229
See application file for complete search history.

(56) References Cited

U.S. PATENT DOCUMENTS

| | | | |
|---|---|---|---|
| 7,554,962 | B2 | 6/2009 | Takeuchi |
| 7,570,656 | B2 * | 8/2009 | Raphaeli ................ H04B 3/542 |
| | | | 370/445 |
| 7,738,876 | B1 | 6/2010 | Radhakrishnan et al. |
| 7,907,582 | B2 | 3/2011 | Du et al. |
| 8,116,285 | B1 | 2/2012 | Barnum |
| 8,320,291 | B2 | 11/2012 | Rune et al. |
| 8,351,390 | B2 | 1/2013 | Gaur |
| 2008/0075033 | A1 | 3/2008 | Shattil |
| 2012/0263084 | A1 | 10/2012 | Liu et al. |

OTHER PUBLICATIONS

International Partial Search Report for Application No. PCT/US2014/035987 dated Sep. 16, 2014.
International Search Report and Written Opinion for Application No. PCT/US2014/035987 dated Oct. 27, 2014.
Examination Report for European Patent Application No. 14730267.3, dated Dec. 14, 2016.

* cited by examiner

US 9,642,038 B2

OFFLOADING COMMUNICATION FROM A CELLULAR NETWORK TO A WIRELESS LOCAL AREA NETWORK

CROSS-REFERENCE TO RELATED APPLICATION

The present application claims priority to U.S. Provisional Patent Application 61/821,810, filed May 10, 2013, the contents of which are incorporated herein by reference.

TECHNICAL FIELD

The present disclosure relates generally to wireless network communication and, more particularly, to interworking between cellular networks and wireless local area networks.

BACKGROUND

Demand for data capacity in cellular networks has increased dramatically with the widespread use of smartphones and tablet computers. In addition to traditional voice services, consumers now expect to be able to use their wireless-enabled devices to watch streaming video, often in a high-definition format, play on-line games in real-time, and transfer large files. This has put additional load on the entire cellular network, including core networks and access networks. Network operators have recently begun deploying wireless local area networks ("WLANs") to operate alongside their cellular networks. This allows the operators to offload at least some of the voice and data traffic onto the WLANs, thus reducing the load on the cellular networks.

BRIEF DESCRIPTION OF THE SEVERAL VIEWS OF THE DRAWINGS

While the appended claims set forth the features of the present techniques with particularity, these techniques may be best understood from the following detailed description taken in conjunction with the accompanying drawings of which:

DETAILED DESCRIPTION

Figure 1:
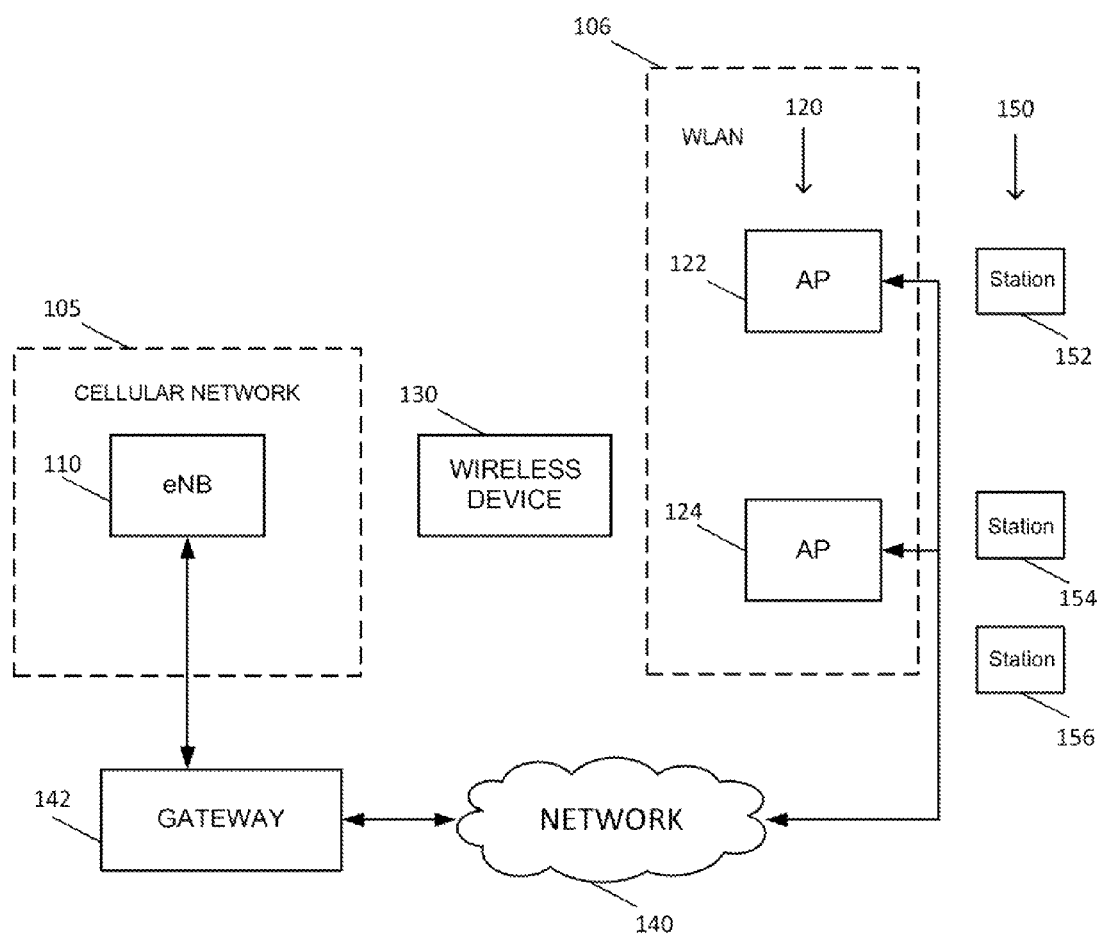
FIG. 1 is a block diagram of a communication system.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Several issues have been observed with respect to WLAN deployments. One issue is that WLANs deployed by cellular operators are often underutilized. As a result, a majority of the data sent to and received from wireless devices are carried by the cellular networks, which often causes them to become overloaded.

The present disclosure sets forth methods for offloading of communication traffic from a cellular network to a WLAN. According to various embodiments, a wireless device determines a time period during which a wireless channel of the WLAN is busy. This first time period may include multiple channel busy periods separated by periods during which the channel is not busy. The wireless device determines a second time period that represents interframe spacings associated with the first time period. The wireless device then determines a modified channel utilization for the wireless channel based on the first time period and on the second time period. The wireless device then reports the modified channel utilization to the cellular network.

As used herein, User Equipment ("UE") refers to a wireless-enabled communication device that can access cellular networks, "wireless station" or "station" refers to a wireless-enabled communication device that can access WLANs, "wireless device" refers to a wireless-enabled communication device that can access cellular networks or WLANs, and "network entity" refers to hardware and software that operate as part of the infrastructure of a wireless network. Possible implementations of a wireless device include a cellphone, a tablet computer, a laptop, and a machine-to-machine device. Possible implementations of a network entity include a cellular base station, an evolved Node B ("eNB"), and an Access Point ("AP") of a WLAN.

Turning to FIG. 1, a wireless communication system 100 according to an embodiment includes an eNB 110 of a cellular network 105, APs 120 of a WLAN 106, and a wireless device 130. The cellular network 105 may have any number of eNBs, and the WLAN 106 can have any number of APs. Any number of wireless devices may communicate over the cellular network 105. The cellular network 105 is communicatively linked to at least one of the APs 120 via a network 140 (e.g., the Internet) and, optionally, via a gateway 142. In alternative embodiments, the gateway 142, one or more of the APs 120, or a combination thereof are part of the cellular network 105. Possible implementations of the cellular network 105 include a time-division multiple-access-based network, a code-division multiple-access-based network, an orthogonal frequency-division multiple-access-based network, a Long Term Evolution ("LTE") network, and a 3rd Generation Partnership Project-based network.

The eNB 110 provides a communication link for the wireless device 130 (e.g., an air interface) to the cellular network 105. The eNB 110 is configured for interworking between the cellular network 105 and the WLAN 106. For example, the eNB 110 is capable of offloading, to the WLAN 106 (via an AP 120), at least a portion of the communication traffic between the eNB 110 and the wireless device 130. For those communications that get offloaded, the communication link between the cellular network 105 and the wireless device 130 is provided through an AP 120, the network 140, and the gateway 142.

Referring still to FIG. 1, the APs 120 include a first AP 122 and a second AP 124. The APs 120 in one embodiment are compatible with The Institute of Electrical and Electronics Engineers ("IEEE") 802.11 standard. The APs 120 cooperate using a shared network name or service set identifier. A service provider of the cellular network 105 operates one or more of the APs 120 to supplement the eNB 110.

The APs 120 provide the wireless stations 150 access to the WLAN 106 (and to the network 140). The wireless stations 150 include a first station 152, a second station 154, and a third station 156. The APs 120 also provide WLAN access to the wireless device 130. For example, the first AP 122 provides WLAN access to the first station 152, the second AP 124 provides WLAN access to the second station 154 and to the third station 156, and the first AP 122 and the second AP 124 provide WLAN access to the wireless device 130.

According to an embodiment, the wireless device 130 has the functionality of both a UE of the cellular network 105 and of a wireless station of the WLAN 106. The wireless device 130 is configured to determine one or more of the following: a modified channel utilization for a wireless channel of the WLAN 106, a cellular Modulation and Coding Scheme ("MCS") for a communication link to the cellular network 105, and a transmission counter for a sequence of virtual packets. The wireless device 130 uses one or more of these parameters to determine whether to offload communication traffic from the cellular network 105 to the WLAN 106. The wireless device 130 may also provide these parameters to the eNB 110, which itself is configured to use one or more of these parameters to determine whether to offload communication traffic from the cellular network 105 to the WLAN 106.

Figure 2:
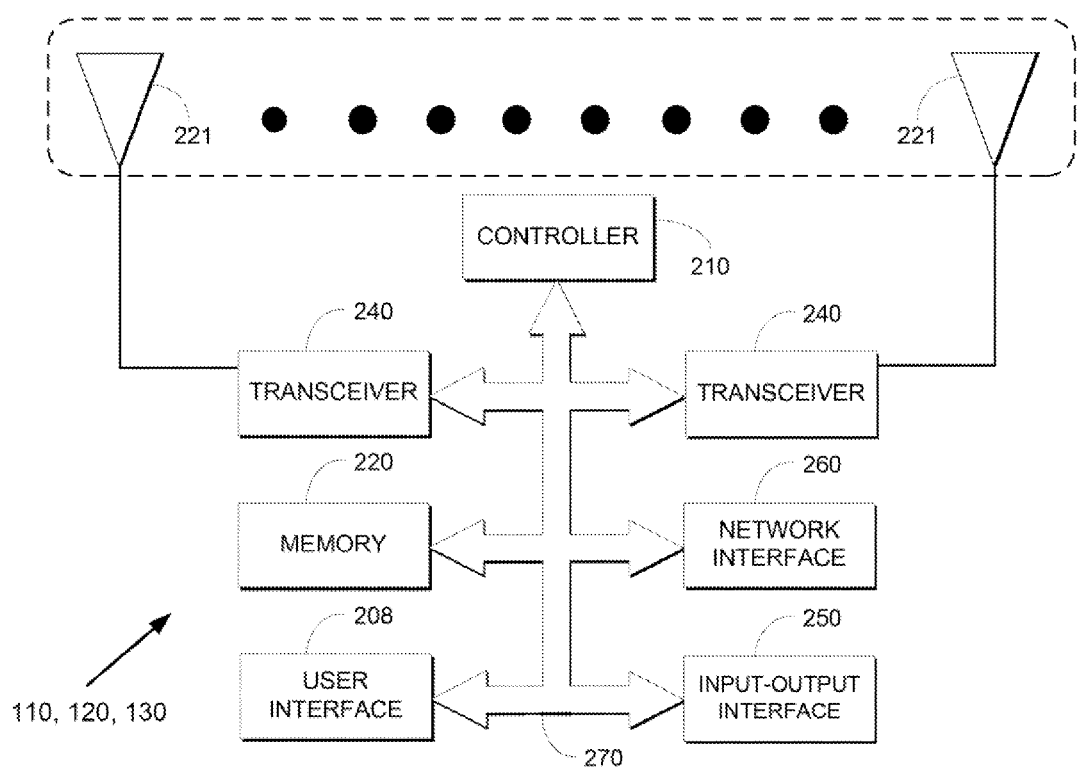
FIG. 2 is a block diagram of a representative enhanced Node B, wireless device, or access point.

FIG. 2 illustrates a possible configuration of the eNB 110, an AP 120, or the wireless device 130 (from FIG. 1). There may be variation among these devices in terms of their configuration. The eNB 110, AP 120, or wireless device 130 includes a user interface 208, a controller 210, a memory 220 (which can be implemented as volatile memory or non-volatile memory), one or more transceivers 240, an input/output ("I/O") interface 250, a network interface 260, and one more antennas 221. Each of these elements is communicatively linked to one another via one or more data pathways 270.

Possible implementations of the data pathways 270 include wires, conductive pathways on a microchip, and wireless connections. Possible implementations of the controller 210 include a microprocessor and a computer. Possible implementations of the network interface 260 include a modem, a network-interface card, and a wireless local area network chipset.

During operation, each transceiver 240 receives data from the controller 210 and transmits Radio Frequency ("RF") signals representing the data via a connected antenna 221. Similarly, each transceiver 240 receives RF signals via the antenna 221, converts the signals into appropriately formatted data, and provides the data to the controller 210.

The controller 210 retrieves instructions and data from the memory 220 and, using the instructions and data, provides outgoing data to, or receives incoming data from, the transceivers 240. The controller 210 also receives data from, and sends data to, external devices via the I/O interface 250.

If the device of FIG. 1 is an eNB, then the network interface 260 is coupled to the backhaul network. In such case, the controller 210 transmits data to other entities of the cellular network 105 (see FIG. 1) via the network interface 260.

Referring again to FIG. 1, the stations 150 follow rules for transmission and reception according to a wireless standard. In one embodiment, the stations 150 comply with the IEEE 802.11 standard, which requires an inactive period between transmissions during which no stations are supposed to transmit. The duration of an inactive period varies depending on the transmissions between which it occurs. These required inactive periods are referred to as interframe spacings. For example, if one station is transmitting many large packets with multiple fragments for each packet, then many of the interframe spacings will be short interframe spacings ("SIFS"). If control is alternating between different stations frequently, however, then many of the interframe spacings may be distributed-coordination-function interframe spacing ("DIFS").

Channel utilization (e.g., the IEEE 802.11 Channel Utilization field) is the percentage of time an AP senses that a channel is busy, as indicated by either a physical or virtual carrier sense ("CS") mechanism. In IEEE 802.11, channel utilization is linearly scaled, with 255 representing 100% utilization, and the Channel Utilization field value is calculated only for the primary channel. Channel utilization is calculated as follows:

$$\text{Channel Utilization} = \text{Integer}\left(\frac{\text{channel busy time}}{dot11ChannelUtilizationBeaconIntervals \times dot11BeaconPeriod \times 1024}\right) \times 255 \qquad \text{Equation 1}$$

The channel-busy time is the number of microseconds during which the CS mechanism has indicated that a channel is busy. The parameter "dot11ChannelUtilizationBeaconIntervals" represents the number of consecutive beacon intervals during which the channel-busy time is measured. While the channel utilization is generally advertised by an AP, wireless stations may perform this calculation.

The DIFS period is generally more than twice the SIFS period. Thus, one station that transmits a large amount of data for a few seconds makes the channel utilization appear to be high, even if other stations have no activity. Alternatively, many stations transmitting and receiving a large amount of data make the channel utilization appear to be low because of the larger DIFS periods separating the transmissions by the different stations.

Referring still to FIG. 1, the wireless device 130 in one embodiment is configured to determine a reference period on a wireless channel of the WLAN 106. The wireless device 130 also determines a channel utilization, which represents the duration within the reference period during which the wireless channel is busy. The wireless device 130 further determines the interframe spacing required between successive transmissions during the busy period. Based on the originally-determined channel utilization and on the required interframe spacing, the wireless device 130 can determine a modified channel utilization for the wireless channel. The wireless device 130 can then report the modified channel utilization to a network entity (e.g., the eNB 110) of the cellular network 105.

Continuing with FIG. 1, the eNB 110 is communicatively linked to the wireless device 130 over a cellular connection. In one embodiment, in order to offload communication traffic to the WLAN 106, the eNB 110 requests the wireless device 130 to provide channel-utilization information for the WLAN 106. The wireless device 130 obtains the channel-utilization information from one or more of the APs 120 and provides this information to the eNB 110. The channel-utilization information includes a channel-utilization metric. During interframe spacings and during transmissions on the wireless channel, the channel-utilization metric will indicate that the channel is busy. If the channel-utilization metric is lower than a predetermined threshold, then the eNB 110 hands over at least a portion of the communication traffic (e.g., voice, video, or other data) from the cellular connection to a WLAN connection (i.e., a connection between the wireless terminal 130 and the WLAN 106).

Figure 3:
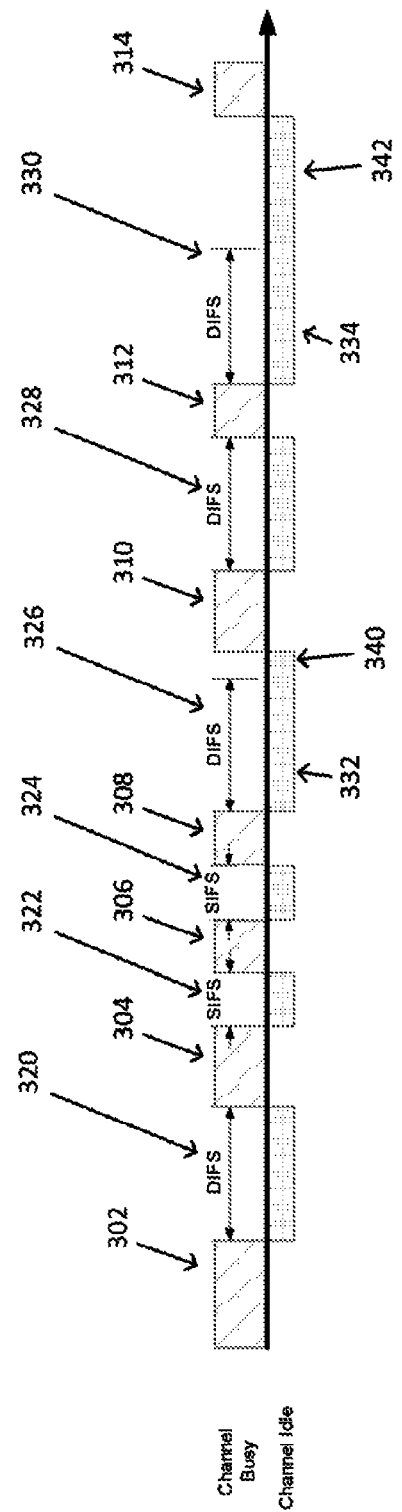
FIG. 3 is a timing diagram for a standard channel-utilization indication.

Turning to FIG. 3, a timing diagram shows channel-busy time (obtained by a CS mechanism) and channel-idle time of a wireless channel of the first AP 122 (see FIG. 1) over a channel busy measurement period or reference period (e.g., dot11ChannelUtilizationBeaconIntervals× dot11BeaconPeriod) based on a standard channel-utilization indication. Busy-time periods 302, 304, 306, 308, 310, 312, and 314 are separated by idle periods 320, 322, 324, 326, 328, and 330. However, while the idle periods appear to occupy a majority of the timing diagram, which might suggest sufficient availability for an additional station to connect with first AP 122, many of these idle periods are required by the wireless standard by which the WLAN 106 operates (e.g., IEEE 802.11). For example, idle periods 320, 322, 324, and 328 are completely filled by required SIFS and DIFS periods (e.g., "silent periods"). Additionally, a substantial portion of idle periods 326 and 330 are filled by required DIFS periods 332 and 334, respectively, leaving only portions 340 and 342 available for attempting other transmissions or receptions.

Figure 4:
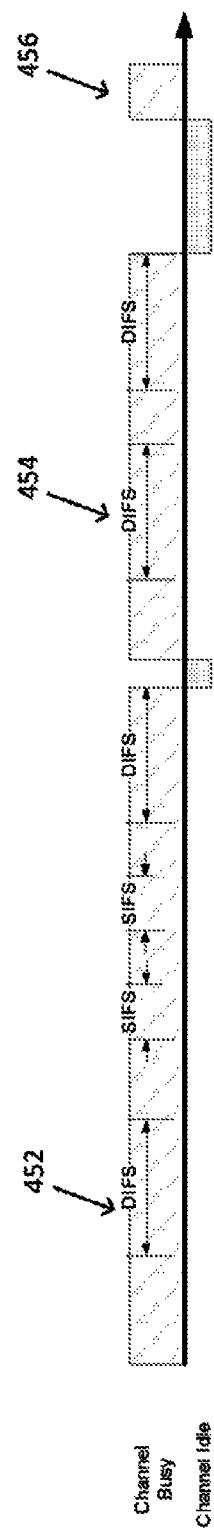
FIG. 4 is timing diagram of a modified channel-utilization indication.

Turning to FIG. 4, a timing diagram illustrates a modified channel-utilization indication that is based on the standard channel-utilization indication of FIG. 3. The modified channel-utilization indication in this embodiment accounts for the silent periods (e.g., SIFS, DIFS, or other required silent periods). In this embodiment, the wireless device 130 is configured to determine the modified channel-utilization indication.

Figure 5:
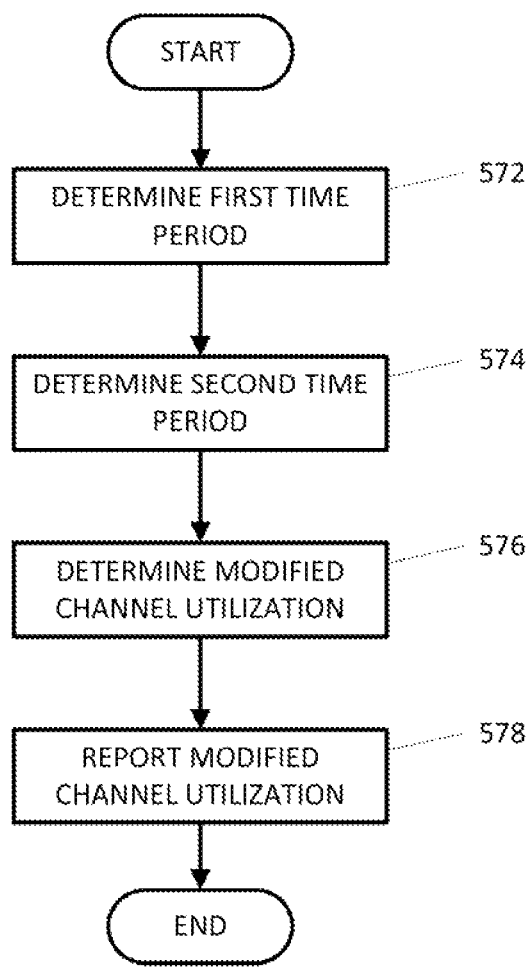
FIG. 5 flowchart of a procedure carried out to determine and report a modified channel utilization.

Turning to FIG. 5, in an embodiment, the wireless device 130 carries out the steps shown in the flowchart. The wireless device 130 determines a value for the channel-busy time (a first time period that represents the busy-time periods) at step 572. At step 574, the wireless device 130 determines a value for the relevant silent periods (a second time period that represents the interframe spacings associated with the first time period). At step 576, the wireless device 130 determines the modified channel utilization based on the value of the channel-busy time and on the value of the relevant silent periods. To do so according to one embodiment, the wireless device 130 replaces the numerator of Equation 1 (e.g., "channel-busy time") with the value of channel-busy time (obtained in step 572) plus the value of the relevant silent periods.

Note that the standard channel-utilization method uses only busy-time periods 302, 304, 306, 308, 310, 312, and 314 (see FIG. 3) to calculate the channel-busy time. In contrast, however, the wireless device 130 of this embodiment calculates both the channel-busy time (based on busy-time periods 302, 304, 306, 308, 310, 312, and 314) and the silent periods (e.g., idle periods 320, 322, 324, and 328, and DIFS periods 332 and 334). Accordingly, the timing diagram of FIG. 4 includes modified busy periods 452, 454, and 456.

Upon determining the modified channel utilization based on the channel-busy time (the first time period) and the silent period (the second time period), the wireless device 130 reports the modified channel utilization to the eNB 110 at step 578 of FIG. 5. In one example, reporting the modified channel utilization includes requesting a handoff to the WLAN channel.

In an embodiment, the wireless device 130 of FIG. 1 is configured to determine the silent period to be added to the channel-busy time by initially setting the silent period to zero for the channel-busy measurement period. For each transmission n and the following transmission n+1 where a SIFS is required between them, the wireless device 130 increments the silent period based on the SIFS. In one embodiment, the wireless device 130 is configured to determine that the SIFS is required if at least one of the following conditions is met: (1) transmission n and transmission n+1 are a transmission from a first device and an acknowledgment frame to the transmission, respectively, (2) transmission n is an acknowledgment frame in response to a previous transmission n−1 from a first device, and transmission n+1 is a transmission from the first device that is a next fragment of a same packet as transmission n−1, (3) transmission n is a request to send a frame and transmission n+1 is a clear to send the frame, or (4) transmission n is a block acknowledgement request and transmission n+1 is a block acknowledgment ("BlockAck").

The acknowledgment frame may include an indication of acknowledgement or an indication of negative acknowledgment. If a BlockAck procedure is in use, then an originating station may send multiple fragments for a packet, successively separated by SIFS (i.e., without acknowledgments in between). However, an observing station may not know that two stations are using a BlockAck procedure. Thus the above set of conditions does not correct for SIFS periods between successive fragments when BlockAcks are used.

For each transmission n and the following transmission n+1 where a DIFS is required between them, the wireless device 130 increments the silent period based on the DIFS. In one embodiment, the wireless device 130 is configured to determine that the DIFS is required if at least one of the following conditions is met: (1) transmission n is from a first device and transmission n+1 is from a second device and is not an acknowledgment frame in response to the first transmission or (2) transmission n is an acknowledgment frame in response to previous transmission n−1 from a first device and transmission n+1 is a transmission from the first device but is not a next fragment of a packet corresponding to transmission n−1.

For example, if the channel-busy measurement period includes one station or access point transmitting multiple fragments, then the above calculation by the wireless device 130 increases the channel utilization based on the SIFS periods between the fragments. If the measurement period includes different stations transmitting packets, then the above calculation increases the channel utilization based on the DIFS periods (which are larger than the SIFS periods) between the packets. Thus, the utilization is higher for the case where multiple stations are exchanging data (even if the data include many small packets).

In another embodiment, instead of replacing the numerator of Equation 1 with the channel-busy time plus the relevant silent periods, the wireless device 130 changes the denominator of Equation 1 so that the duration in the denominator excludes the interframe spacing periods. This is performed by subtracting the cumulative required interframe spacings (based on the conditions as described above) from the channel-busy measurement period.

In an embodiment of the disclosure, mapping or conversion of WLAN Channel State Information ("CSI") measurements to equivalent downlink and uplink data rates and cellular Channel Quality Indicator ("CQI") occurs as follows. A CQI report is generated by the wireless device 130 using information based on the wireless channel over which the wireless device and AP are communicating. This CQI report is referred to herein as WLAN CSI. The WLAN CSI takes into account both the quality of a communication link to the AP and the loading of the AP. WLAN CSI can be determined for uplink communication as well as downlink communication.

Downlink and uplink data rates on IEEE 802.11 communication links in one embodiment are asymmetric due to different numbers of transmission and reception antennas, different utilization levels for resources by access points and stations, differences in explicit or implicit beamforming support, CSI feedback support, low density parity check support, and other factors. Accordingly, alternative calculations for CQI are necessary for WLAN downlink and uplink data rates. The WLAN CSI report sent by the wireless device 130 to the eNB 110 in one embodiment uses channel sounding with one, two, three, or four transmission antennas.

Turning again to FIG. 1, the wireless device 130 in one embodiment selects an MCS index from a set of available MCS indices maximizes downlink data rate as:

$$R_{WLAN}^{(DL)}(MCS) = (1 - BLER(\Pi, MCS)) R^{(peak)}(MCS, Qos)(1-CRU),$$

where $R_{WLAN}^{(DL)}$(MCS) is the WLAN data rate (which represents the total downlink ("DL") data rate that may be achieved based on measurements made by the wireless device 130), BLER(Π,MCS) is the Block Error Rate ("BLER") for a single contention window (transmitted over $N_{ss}$ streams, assuming vertical encoding), Π is the channel state (a collection of estimated subband channel matrices and signal to noise ratio), $R^{(peak)}$(MCS,QoS) is the peak data rate achievable over the bandwidth (e.g., 20 or 40 Megahertz ("MHz") per channel using $N_{ss}$ spatial streams) with the Quality of Service ("QoS") mode that may be established for a candidate traffic flow that is being offloaded from the cellular network 105, and CRU is the Channel Resource Utilization ("CRU"). The BLER is based on a channel state for the first radio link, the WLAN modulation and coding scheme, or both.

For a wireless channel with time-varying channel state information, the wireless device 130 determines an average WLAN data rate $E[R_{WLAN}^{(DL)}(MCS)]$ by taking an average over time (and therefore, over different channel state realizations).

Selection of an MCS by the wireless device 130 in this case is denoted by:

$$MCS_{WLAN}^{(selected)} = \arg\max_{MCS \in BasicMCSSet} E[R_{WLAN}^{(DL)}(MCS)].$$

Alternatively, the wireless device 130 sends individual parameters, such as the MCS, $R^{(peak)}$(MCS,QoS), or CRU, to enable the eNB 110 to receive these measurements or, optionally, to forward information based on the measurements to a mobility management entity of the cellular network 105.

Referring still to FIG. 1, the wireless device 130 in one embodiment directly determines a data rate supportable by the wireless channel of the WLAN 106 (e.g., a wireless channel over which the wireless device 130 and AP 120 are communicating) for a given traffic flow in its determination of the $R^{(peak)}$(MCS,QoS) function. The value of the $R^{(peak)}$(MCS,QoS) function is based on whether or not the AP can guarantee QoS for the traffic flow that the wireless device 130 or cellular network 105 intends to offload to the AP (i.e., to the WLAN 106). The $R^{(peak)}$(MCS,QoS) function may take into account other APs. The $R^{(peak)}$(MCS, QoS) function may also take into account receiver capabilities, such as whether high throughput greenfield format preamble or mixed-mode are supported, whether low density parity check is supported, and whether short or long guard intervals are used.

The wireless device 130 in one embodiment is configured to select an MCS for the cellular network 105 that approximates the data rates that may be obtained on the WLAN wireless channel. For example, the wireless device 130 selects an $MCS_{LTE}$ such that:

$$E[R_{WLAN}^{(DL)}(MCS_{WLAN}^{(selected)})] = \sum_{l=1}^{v} R_{LTE}(MCS_{LTE,}^{(selected)}(l)),$$

where $R_{LTE}(MCS_{LTE,}^{(selected)}(l))$ is the LTE data rate that is determined as a function of an LTE MCS $MCS_{LTE,}^{(selected)}(l)$ for the l-th layer, and v is the rank (e.g., total number of layers). Transport block selection assumes one reference subframe and full bandwidth allocation. For example, for 10 MHz LTE downlink channels, all 50 resource blocks in 1 subframe are assumed to be transmitted using, for example, open loop transmit diversity space-frequency block coding. In one embodiment, the wireless device 130 reports $MCS_{LTE,}^{(selected)}(l)$ to the eNB 110. The wireless device 130 determines an equivalent rank v, and includes v in its feedback together with an MCS for the respective rank. Further, once the equivalent rank is computed, the wireless device 130 may re-compute MCSs such that the MCSs across different l's are equal. The theoretical peak rate is 6 bits per second ("bps") per Hertz ("Hz") per layer with a code rate equal to 1, but a typical peak rate is in the range 50-60 Megabits per second ("Mbps") per layer for a 10 MHz LTE downlink channel. With rank 2 and 4 transmissions (e.g., v equal to 2 or 4), peak data rates up to 100 Mbps and 200 Mbps, respectively, are possible using a 10 MHz LTE downlink. The ability for the wireless device 130 to provide an equivalent rank (and MCSs conditioned on the rank) to the eNB 110 gives the eNB 110 the ability to match the data rate achievable on the WLAN link to the closest LTE rank and LTE wideband MCS.

Referring still to FIG. 1, the above-discussed feedback mechanism, including wideband CQI and rank, provides the eNB 110 with an estimate of an average supportable data rate on the WLAN link. Accordingly, modification or extension of the cellular MCS table is not necessary (given that the offloading is from or to the LTE communication link). Translating the WLAN MCS to a cellular MCS allows the eNB 110 to make a comparison between a data rate achievable on a candidate WLAN AP to the data rate achievable through a neighbor eNB (e.g., a neighbor macro-cell or an LTE small cell). For example, the eNB 110 may consider the WLAN AP and an LTE small cell (such as an LTE pico eNB or an LTE femto eNB) as candidates for offloading. If the translated cellular MCS indicates that the data rate achievable on the WLAN AP is higher than the data rate achievable on the LTE small cell, then the cellular network 405 may prefer to offload the wireless device 130 to the WLAN AP. If the translated cellular MCS indicates that the data rate achievable on the WLAN AP is lower than the data rate achievable on the LTE small cell, then the LTE network may prefer to perform a handover of the communication link for the wireless device 130 to the LTE small cell.

The wireless device 130 in one embodiment is configured to evaluate whether a specific criterion is met in order to filter the CQI reports based on measurements configured through a serving cell radio resource controller. Alternatively, the wireless device 130 is configured to continue searching for a WLAN communication link and to send a report to the eNB 110 when predetermined criteria are met. In one embodiment, the wireless device 130 sends the CQI report when the translated cellular MCS exceeds a threshold or when the estimated data rate over the WLAN exceeds a threshold. On another embodiment, the wireless device 130 sends the CQI report when the translated cellular MCS exceeds the last reported serving cell MCS by an offset.

Continuing with FIG. 1, the eNB 110 in one embodiment is configured to request the transmission counter from the wireless device 130. The eNB 110 establishes a cellular connection with the wireless device 130. The eNB 110 requests the wireless device 130 to report a failure count of transmissions of a sequence of virtual packets. The eNB 110 receives the failure count of transmissions, where the failure count indicates the number of times transmissions of packets of the virtual sequence of packets would have failed. If the failure count is lower than a threshold, then the eNB 110 performs a handover of at least a portion of data being transmitted over the cellular connection to a connection between the wireless device 130 and the wireless local area network. The eNB 110 in one embodiment provides information about the sequence of virtual packets, including transmission times of each virtual packet in the sequence. The eNB 110 obtains a measure of transmission delay of the virtual sequence of packets. If the transmission delay of the virtual sequence of packets is below a delay threshold, then the eNB 110 performs the handover.

Figure 6:
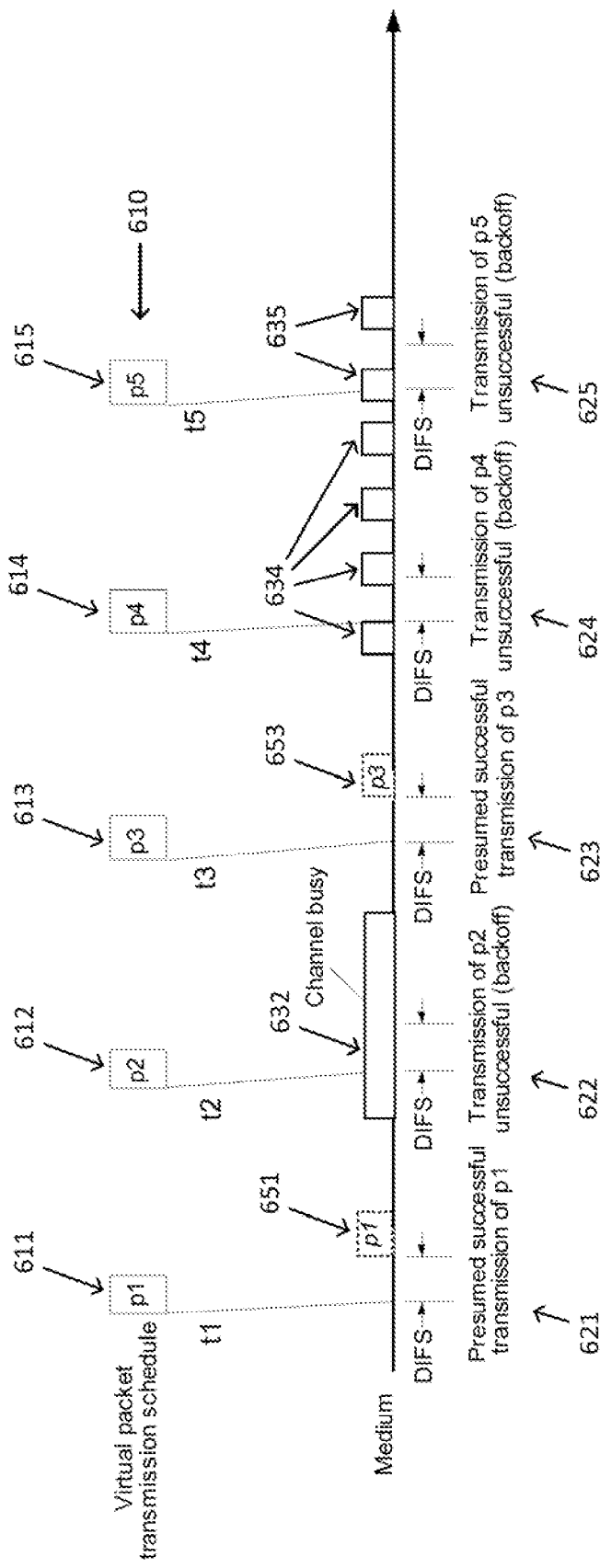
FIG. 6 is a timing diagram of a virtual-packet transmission schedule.

Turning to FIG. 6, a timing diagram shows a virtual sequence 610 of packets that includes packets 611, 612, 613, 614, and 615, having respective transmission times of t1, t2, t3, t4, and t5. While five packets are shown, a larger or smaller number of packets may be used in alternative implementations. The wireless device 130 is configured to prepare the virtual sequence 610 of packets and to submit the virtual sequence to a media-access control layer of the wireless device 130 at the corresponding transmission times. For a packet $p_i$ of the virtual sequence 610, the wireless device 130 monitors the wireless channel of the WLAN 106 for a transmission-capability period at time $t_i$ of the corresponding transmission times. The transmission-capability periods in one implementation are equal to the DIFS period for the wireless channel. In alternative implementations, a different interframe spacing period is used.

Turning back to FIG. 1, if the wireless channel of the WLAN 106 (the wireless channel over which the wireless device 130 and an AP 120 are communicating, or "WLAN channel") is inactive for the transmission-capability period, then it may be presumed that successful transmission of packet $p_i$ would have been possible (e.g., had the packet p, been a real packet). If the WLAN channel is active during all or a portion of the transmission-capability period, then it may be presumed that the transmission of packet $p_i$ would not have been successful, and the wireless device 130 increments the transmission counter. In this case, the transmission counter provides a backoff counter and thus indicates a number of times that the wireless device 130 would have had to back off in order to send the virtual sequence 610 successfully.

In an embodiment, the transmission counter includes a sequence of backoff counters and each virtual packet in the sequence of virtual packets has a corresponding backoff counter. If the transmission capability indicates that the wireless channel is busy at the transmission time of the virtual packet, then the wireless device 130 increments the backoff counter corresponding to a virtual packet. The wireless device 130 reports the transmission counter to the eNB 110 or another entity within the cellular network 105 as a representation of congestion on the WLAN channel.

In some implementations, if the transmission of a packet would require a backoff, then transmissions of subsequent packets in the virtual sequence of packets 610 may be delayed. The wireless device 130 in one embodiment is configured to determine and report at least one of a number of repeat backoffs, a total number of backoffs for the virtual sequence 610 of packets, a delay metric (or expected wait-time metric), or a transaction duration for the virtual sequence 610 of packets (i.e., a duration of time to transmit the entire virtual sequence of packets). These parameters are reported to the eNB 110 or to the cellular network 105 separately (e.g., when the average data rate exceeds a certain threshold necessary to support a delay-sensitive traffic flow $E[R_{WLAN}^{(DL)}(MCS_{WLAN}^{(selected)})] > R_0$) or are reported together with the WLAN CSI.

Continuing still with FIG. 1, according to an embodiment, the delay metric indicates a delay due to activity on the WLAN channel. This delay can be viewed as the interval between a first time, when the wireless device 130 is ready to transmit a virtual packet (e.g., without consideration of the busy state of the WLAN channel) and a second time, when the WLAN channel is not busy and thus available for the transmission. In an embodiment, the wireless device 130 is configured to use the delay metric for delay-sensitive traffic flows such as voice over Internet protocol calls or real-time video. The wireless device 130 computes the delay metric based on virtual transmissions. For example, the wireless device 130 can count the number of times a backoff would have to be applied (for a packet that would have been transmitted) and can then compute the associated delay. In another example, after a transmission is completed and if data are present, then the wireless device 130 performs a carrier sense for a DIFS duration. If the WLAN channel is not silent for the entire DIFS, then the wireless device 130 may perform a backoff. In another embodiment, the wireless device 130 measures a number of backoff values and then computes a cumulative distribution function or computes a mean backoff value (i.e., the first moment) to estimate the total delay to the next transmission. This provides an alternative measure of congestion or channel-resource utilization and provides an indication of whether the WLAN channel may be able to support a delay-sensitive traffic flow.

Turning back to the example shown in FIG. 6, transmission-capability periods 621, 622, 623, 624, and 625 begin at transmission times t1, t2, t3, t4, and t5 for the virtual sequence 610 of packets. The WLAN channel is inactive during the transmission-capability periods 621 and 623. Thus, it may be presumed that packets 611 and 613 would have been successfully transmitted, as shown by virtual transmissions 651 and 653, respectively. The WLAN channel is active for a busy period 632, which overlaps the entire duration of transmission-capability period 622. Thus, it may be presumed that packet 612 would not have been successfully transmitted at time t2, and therefore the wireless device 130 increments the transmission counter. The WLAN channel is also active for busy periods 634, which partially overlap the transmission-capability period 624. Thus, it may be presumed that packet 614 would not have been successfully transmitted at time t4, and therefore the wireless device 130 increments the transmission counter again. The WLAN channel is also active for busy periods 635, which partially overlap the transmission-capability period 625. Thus, it may be presumed that packet 615 would not have been successfully transmitted at time t5, and the wireless device 130 therefore increments the transmission counter again. Accordingly, the transmission counter for the virtual sequence of packets 610 has a value of three.

Referring back to FIG. 1, in an embodiment, the wireless device 130 is configured to determine whether an AP 120 may accomplish transmission of a virtual sequence of packets to the wireless device 130. As described above, the wireless device 130 and the AP 120 do not actually perform transmissions of the packets in the sequence. Instead, the wireless device 130 determines whether the WLAN channel would allow transmission (or reception) of the virtual packets (e.g., when the channel is not busy according to the CS mechanism) at specified times, within specified transmission-capability periods, or within an evaluation period. The wireless device 130 may further determine the times at which the transmissions could have occurred. In one embodiment, the wireless device 130 determines how long each packet would have to be delayed based on the activity on the channel. The wireless device 130 uses the determined delay (per packet, cumulative, or a combination thereof) as an indication of congestion on the WLAN channel.

Figure 7:
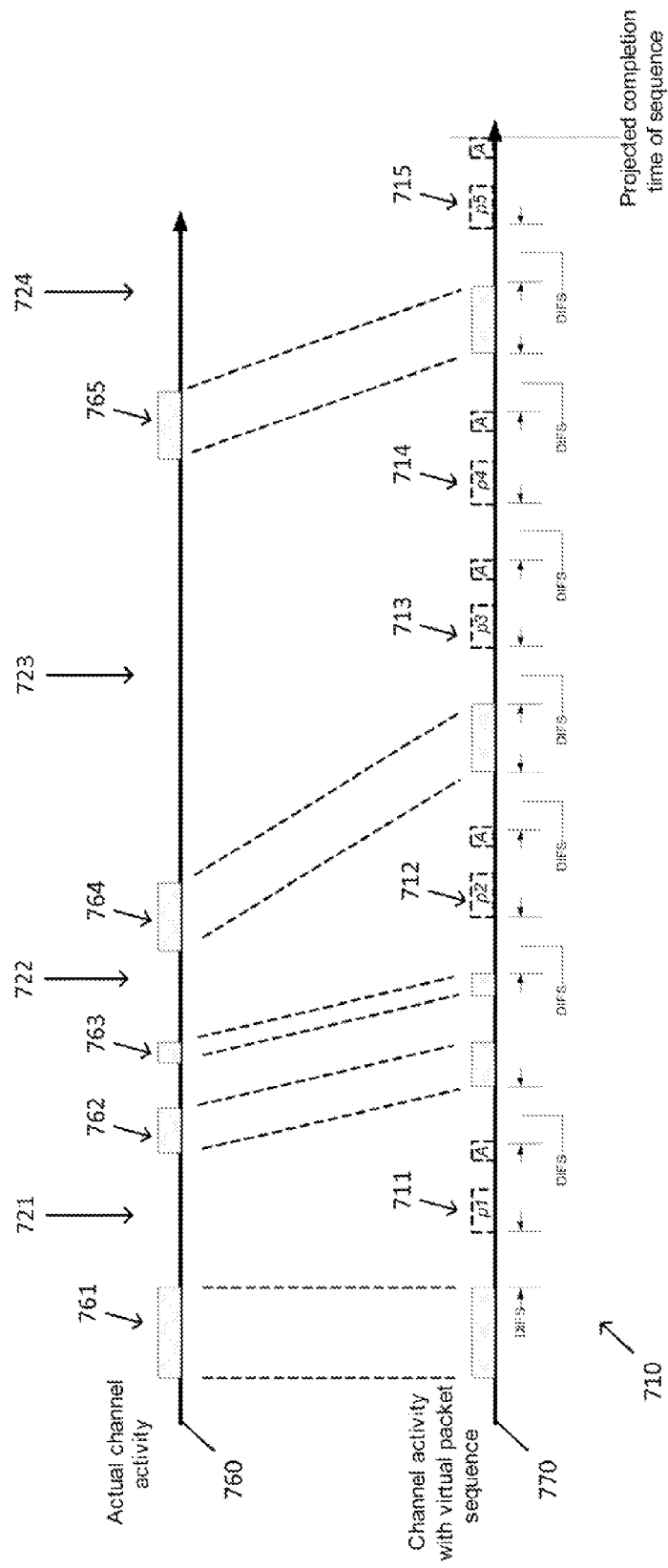
FIG. 7 is a timing diagram of a virtual-packet receipt schedule.

Turning to FIG. 7, a timing diagram has a virtual sequence 710 of packets for transmission from the AP to the device, actual channel activity 760, and a modified channel activity 770. The virtual sequence 710 of packets includes packets 711, 712, 713, 714, and 715 (shown with acknowledgments sent to the AP). While five packets are shown for the virtual sequence 710 of packets, a larger or smaller number of packets may be used in alternative implementations. The wireless device 130 in one embodiment is configured to monitor the actual channel activity 760 and to determine, based on the actual channel activity 760, a transmission counter that indicates a projected duration of time needed to receive the virtual sequence of packets. As shown, the actual channel activity 760 includes actual transmissions 761, 762, 763, 764, and 765. For each packet of the virtual sequence of packets 710, the wireless device 130 determines an earliest time at which the packet could have been transmitted.

Referring still to FIG. 7, the wireless device 130 in one embodiment selects a time for each packet such that the time duration between successive transmissions meets the requirements specified in the IEEE 802.11 standard for interframe spacings. For example, if the preceding packets in the virtual sequence (e.g., packet $p_{i-1}$, $p_{i-2}$, etc.) have been transmitted, and time $t_i$ is at least a DIFS period later than an end of the last activity on the channel, then the wireless device 130 considers a transmission of packet $p_i$ of the virtual sequence of packets 710 to be possible at time $t_i$.

Continuing with FIG. 7, the wireless device 130 includes both virtual transmission from the virtual sequence of packets 710 and the actual channel activity 760 in determining the last activity on the channel. For example, if the transmission capability indicates that the WLAN channel is not busy at the transmission time, then the wireless device 130 increments the transmission counter by a first amount, corresponding to the transmission of a packet $p_i$. If the transmission capability indicates that the wireless channel is busy at the transmission time, then the wireless device 130 increments the transmission counter by a second amount, corresponding to the transmission of the packet $p_i$ and the actual channel activity 760. In one embodiment, the wireless device 130 determines that the wireless channel is busy at the transmission time, monitors the wireless channel for a channel busy duration until the wireless channel is not busy, and then increments the transaction duration by an amount that includes the channel busy duration plus the required interframe spacing.

As shown in FIG. 7, packets 711, 712, 713, 714, and 715 are virtually transmitted during transmission-capability periods 721, 722, 723, and 724 of the actual channel activity 760. The modified channel activity 770 includes the actual transmissions 761, 762, 763, 764, and 765 with packets 711, 712, 713, 714, and 715 inserted therein, with appropriate interframe spacing (e.g., DIFS). However, the insertions into the modified channel activity 770 as described and shown in FIG. 7 are for illustrative purposes. The wireless device 130 does not need to perform these insertions.

Continuing with FIG. 7, the modified channel activity 770 includes the actual transmission 761, followed by the packet 711 inserted into the first available transmission-capability period 721. The transmission time for the packet 711 and associated interframe spacings are larger than the transmission-capability period 721, however. Thus, the actual transmissions 762 and 763 are inserted into the modified channel activity 770 after the Acknowledge ("ACK") to packet 711 and the interframe spacing (e.g., DIFS) offset from their actual transmission times due to the packet 711 and its ACK. Analogously, packet 712 (inserted into transmission-capability period 722), actual transmission 764, packets 713 and 714 (inserted into transmission-capability period 723), actual transmission 765, and packet 715 (inserted into transmission-capability period 724) may be inserted into the modified channel activity 770 after the actual transmission 763.

Turning back to FIG. 1, in an embodiment, the eNB 110 or the cellular network 105 selects or determines virtual-packet information and provides the virtual-packet information to the wireless device 130. Alternatively, the wireless device 130 determines or selects the virtual-packet information. The selection or determination of the virtual-packet information may also be performed by a combination of one or more of the wireless device 130, the eNB 110, and the cellular network 105. The virtual-packet information includes one or more of the virtual sequence 710 of packets, corresponding transmission times for the packets (e.g., times for sending to or receiving by the wireless device 130), corresponding sizes of the packets, a predetermined amount of data, and a predetermined time duration for transmission.

Referring still to FIG. 1, in an embodiment, the virtual-packet information or portions thereof are selected from a pre-configured set of virtual-packet information (e.g., a set of virtual-packet sequences) or dynamically determined by the wireless device 130, the eNB 110, or the cellular network 105. In one embodiment, the virtual-packet information is selected or determined based on a service or traffic type that the cellular network 105 seeks to offload to the WLAN 106. For example, if the cellular network 105 seeks to offload video traffic, then transmission times are selected to be separated by durations that are typical in actual video transmission streams. In this case, each virtual sequence of the pre-configured set corresponds to a different type of traffic or service. In another example, the wireless device 130 establishes a cellular connection to the eNB 110, records times of packet transmissions on the cellular connection for a time period, and generates the sequence of virtual packets based on the recorded packet transmissions over the time period.

In another embodiment, the virtual-packet information includes a sequence of packets and corresponding durations of packet transmissions for each of the packets. In this case, the corresponding transmission times for each of the packets are selected by the wireless device 130. The wireless device 130 determines, based on the durations of packet transmission, whether the entire virtual packet could be transmitted on the WLAN channel and increments the transmission counter for each virtual packet that would not have been able to be transmitted.

In another embodiment, the virtual-packet information includes a virtual sequence of packets with corresponding sizes for each packet. In this case, the wireless device 130 determines, based on the sizes for each packet, the duration of transmission for each packet or a projected time for transmission of the entire virtual sequence of packets. The wireless device 130 determines, based on the duration of transmission, whether the entire virtual packet could have been transmitted on the WLAN channel and increments the transmission counter for each virtual packet that would not have been able to be transmitted.

According to another embodiment, the virtual-packet information includes a predetermined amount of data and the predetermined time duration for transmission. In this embodiment, the wireless device 130 is configured to determine whether the predetermined amount of data may be transmitted on a WLAN channel within the predetermined time duration. If the predetermined amount of data could have been transmitted within the predetermined time duration, then the wireless device 130 sets the transmission counter to zero. Alternatively, the transmission counter may be set to indicate the difference between the duration of time estimated for the transmission of the predetermined amount of data and the predetermined time duration. In this case, APs for which the amount of time estimated for the transmission is lower may be regarded as better suited for offloading.

The virtual-packet information may further include time delay budgets for one or more packets of a virtual sequence of packets. For example, the wireless device 130 determines whether the packets may be transmitted and received within the time-delay budget to determine a likelihood of a QoS requirement being met. If more than a threshold number of packets in the virtual sequence of packets cannot be transmitted within the time-delay budget, then the wireless device 130 determines that the corresponding AP is not able to satisfy the QoS requirement.

Turning again to FIG. 1, the wireless device 130 may be configured to determine a transmission counter for multiple APs (e.g., APs 122 and 124) and to select the AP with the lowest transmission counter. The transmission counters for the APs 122 and 124 may be determined simultaneously, sequentially, or during partially overlapping evaluation periods. If multiple APs are evaluated, then the wireless device 130 reports the transmission counter for each AP. Alternatively, the wireless device 130 selects and reports a subset of the transmission counters, such as the lowest transmission counter or a set of transmission counters that are within a predetermined range. In one embodiment, the wireless device 130 selects an AP based on the transmission counters and reports the identity of the selected AP instead of the transmission counter.

According to another embodiment, the wireless device 130 is configured to determine equivalent downlink or uplink data rates for a wireless channel of an AP (e.g., a radio link between the AP 122 and the wireless device 130) and the corresponding CQI and to report the data rates and CQI to the eNB 110. This enables the eNB 110 to determine whether a particular data rate is sustainable by an AP and which of the APs (when multiple APs are available) would be most suitable for a handover. The wireless device 130 is configured to determine one or more of a total estimated downlink data rate for the AP (e.g., based on channel-state measurements by the wireless device 130), a best WLAN MCS that the wireless device 130 may select when joining the AP, or a cellular MCS that corresponds to the best WLAN MCS. In one embodiment, the eNB 110 configures CQI reporting for WLA wireless channels, and accordingly the wireless device 130 reports the cellular MCS in a corresponding CQI report. In one embodiment, reporting the cellular MCS includes requesting a handoff to the WLAN channel.

Figure 8:
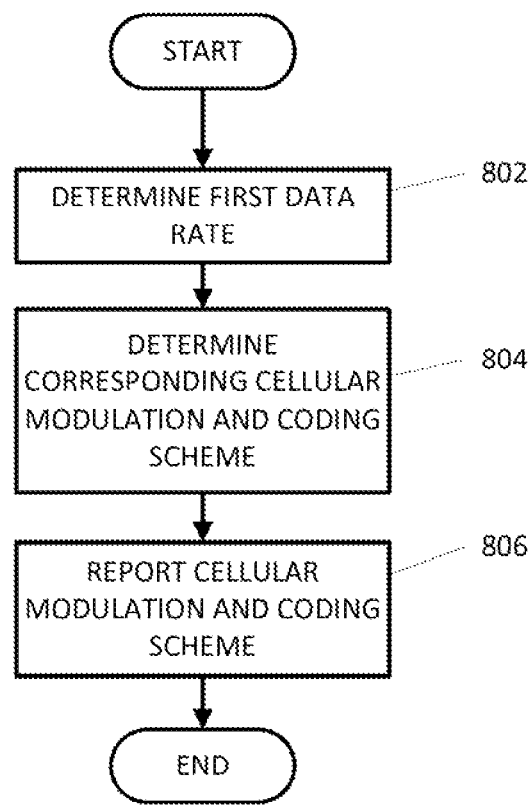
FIG. 8 is a flowchart of a procedure carried out to report a cellular modulation and coding scheme.

Turning to FIG. 8, in an embodiment, the wireless device 130 carries out the steps shown in the flowchart. Without establishing a connection to the WLAN AP, the wireless device 130 estimates a channel state of the first radio link. At step 802, the wireless device 130 determines a first data rate based on the estimated channel state of the first radio link. At step 804, the wireless device 130 determines a corresponding cellular MCS applicable to a second radio link (between the eNB 110 and the wireless device 130) based on the first data rate. At step 806, the wireless device 130 reports the cellular MCS to the eNB 110. In one embodiment, the wireless device 130 receives a request for CQI reports on the WLAN 106 from the eNB 110. In this case, the wireless device 130 sends a CQI report that includes the corresponding cellular MCS to the eNB 110. If the channel quality is higher than a threshold, then the eNB 110 performs a handover of at least a portion of data being transmitted over the cellular connection to a connection between the wireless device 130 and the AP 120.

Turning back to FIG. 1, in an embodiment, the wireless device 130 is configured to determine a transmission counter for a sequence of virtual packets. For example, the wireless device 130 determines whether it may accomplish transmissions (e.g., uplink transmissions) or receptions (e.g., downlink transmissions) of the sequence of virtual packets on the WLAN channel. The wireless device 130 does not actually perform the transmissions or receptions of the packets in the sequence, which would require a communication link to the corresponding AP. Instead, the wireless device 130 determines whether the WLAN channel would allow transmission or reception of virtual packets (e.g., the channel is not busy according to the CS mechanism) at specified times, within specified transmission-capability periods, or within an evaluation period. In one embodiment, if the wireless device 130 would be unable to perform the transmission or reception due to the WLAN channel being busy, then the number of packets that were able to be sent or received (or alternatively, not able to be sent or received) or the time that would have been needed to send or receive the packets is used as an indication of congestion on the WLAN channel.

Figure 9:
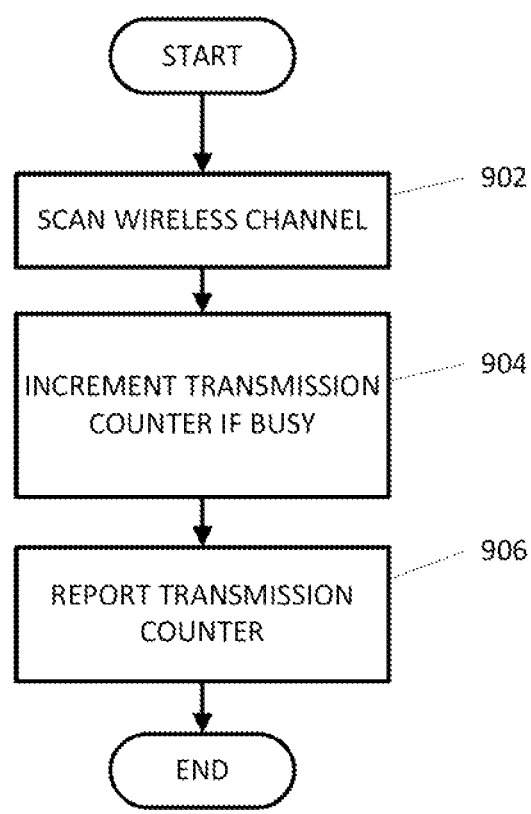
FIG. 9 is a flowchart of a procedure carried out to determine a transmission counter.

Turning to FIG. 9, in an embodiment, the wireless device 130 carries out the steps shown in the flowchart. The wireless device 130 scans a WLAN channel for transmission capability (e.g., for uplink or downlink transmissions) for the sequence of virtual packets at step 902. This may include scanning the wireless channel for idle periods during which the wireless device 130 can attempt transmissions of the sequence of virtual packets. This scanning process may also include scanning the wireless channel to determine whether the channel is inactive for less than a DIFS duration. If the channel is inactive for less than a DIFS duration, then the wireless device 130 determines that the channel is busy at the transmission time of the virtual packet. If the transmission capability for a virtual packet of the sequence indicates that the wireless channel is busy at a transmission time for the virtual packet, then the wireless device 130 increments a transmission counter for the WLAN 106 at step 904. The wireless device 130 then reports the transmission counter or related information to the cellular network 105 at step 906. The transmission counter represents a number of packets, a duration of time for transmission for individual packets, a transaction duration for a sequence of packets or an amount of data (e.g., a duration of time to transmit the entire sequence of packets or amount of data), or a combination thereof. The determination of transaction durations based on the size may take into account the MCS that can be supported at that time on the WLAN channel.

In view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method on a wireless device for a cellular network, the method comprising:
   determining a first time period that represents channel-busy time on a wireless channel of a wireless local area network;
   determining a second time period that represents an interframe spacing associated with the first time period;
   determining a modified channel utilization for the wireless channel based on the first time period and on the second time period; and
   reporting the modified channel utilization to a network entity of the cellular network;
   wherein determining the modified channel utilization comprises: adding the first and second time periods to obtain a modified channel-busy time; and determining the modified channel utilization based on the modified channel-busy time and on a channel utilization formula of the wireless local area network.

2. The method of claim 1:
   wherein the first time period occurs during a reference period of the wireless local area network; and
   wherein determining the modified channel utilization comprises:
      subtracting the second time period from the reference period to obtain a modified reference period; and
      determining the modified channel utilization based on the modified reference period and on a channel utilization formula of the wireless local area network.

3. The method of claim 1:
   wherein the first time period occurs during a reference period of the wireless local area network; and
   wherein determining the second time period comprises:
      comparing first and second sequential transmissions on the wireless channel during the reference period;
      if a short interframe spacing is required between the first and second sequential transmissions, then incrementing the second time period based on a short interframe spacing; and
      if a distributed-coordination-function interframe spacing is required between the first and second sequential transmissions, then incrementing the second time period based on the distributed-coordination-function interframe spacing.

4. The method of claim 1 wherein the channel-busy time represents a time of a reference period during which a sequence of transmissions on the wireless channel is sent, the method further comprising:
   determining a standard channel utilization based on the channel-busy time; and
   determining a plurality of required interframe spacings, each required interframe spacing of the plurality corresponding to a pair of transmissions in the sequence of transmissions;
   wherein determining a modified channel utilization for the wireless channel comprises determining the modified channel utilization based on the standard channel utilization and on the plurality of required interframe spacings.

5. A method on a wireless device for a cellular network, the method comprising:
   determining a first data rate of a first radio link between a wireless local area network access point and the wireless device without establishing a connection to the wireless local area network access point;
   determining a corresponding cellular modulation and coding scheme of a second radio link between a base station of a cellular network and the wireless device based on the first data rate;
   reporting the cellular modulation and coding scheme to the base station of the cellular network;
   estimating a channel state of the first radio link; and
   determining the first data rate of the first radio link based on the channel state of the first radio link.

6. The method of claim 5 further comprising:
   receiving a request for channel-quality indication reports on the wireless local area network from the first base station;
   wherein reporting the cellular modulation and coding scheme comprises sending, to the first base station, a channel-quality indication report that includes the corresponding cellular modulation and coding scheme.

7. The method of claim 5 wherein determining the cellular modulation and coding scheme comprises:
   selecting, based on a block error rate, a peak data rate, or a channel resource utilization, a wireless local area network modulation and coding scheme from a set of available modulation and coding schemes; and
   determining a corresponding cellular modulation and coding scheme based on the wireless local area network modulation and coding scheme.

8. The method of claim 5 wherein reporting the cellular modulation and coding scheme comprises:
   if the cellular modulation and coding scheme exceeds a first threshold, or if the achievable data rate over a wireless local area network exceeds a second threshold, or if, based on a modulation and coding scheme for a last reported serving cell for the wireless device, the cellular modulation and coding scheme exceeds a third threshold, then reporting the cellular modulation and coding scheme.

9. A method on a wireless device for a cellular network, the method comprising:
   scanning a wireless channel of a wireless local area network for a transmission of a sequence of virtual packets;

if the transmission of a virtual packet of the sequence of virtual packets indicates that the wireless channel is busy at a transmission time for the virtual packet, then incrementing a transmission counter for the wireless local area network;

reporting the transmission counter to the cellular network; and receiving the sequence of virtual packets and the times of transmission from a base station of the cellular network.

10. The method of claim 9 wherein scanning the wireless channel comprises scanning the wireless channel for idle periods during which the wireless device can attempt transmissions of the sequence of virtual packets.

11. The method of claim 9 wherein scanning the wireless channel for a transmission capability for a virtual packet of a sequence of virtual packets comprises:

scanning the wireless channel to determine whether the channel is inactive for at least a distributed-coordination-function interframe spacing duration; and if the channel is inactive for less than the distributed-coordination-function interframe spacing duration, then determining that the channel is busy at the transmission time of the virtual packet.

12. The method of claim 9 further comprising:

receiving, from a network entity of the cellular network, a sequence of transmission times corresponding to the sequence of virtual packets;

wherein the transmission counter comprises a sequence of backoff counters, each virtual packet in the sequence of virtual packets having a corresponding backoff counter; and wherein incrementing the transmission counter comprises:

if the transmission capability indicates that the wireless channel is busy at the transmission time of the virtual packet, then incrementing the backoff counter corresponding to a virtual packet.

13. The method of claim 9:

wherein the transmission counter comprises a transaction duration for the sequence of virtual packets; and wherein incrementing the transmission counter comprises:

if the transmission capability indicates that the wireless channel is not busy at the transmission time, then incrementing the transaction duration by a first amount; and if the transmission capability indicates that the wireless channel is busy at the transmission time, wherein the second amount is larger than the first amount, then incrementing the transaction duration by a second amount.

14. The method of claim 13 wherein incrementing the transaction duration by a second amount comprises:

determining that the wireless channel is busy at the transmission time;

monitoring the wireless channel for a channel busy duration until the wireless channel is not busy; and incrementing the transaction duration by the second amount, wherein the second amount includes the channel busy duration.

15. The method of claim 9 wherein the transmission time for the virtual packet is based on a traffic type for the virtual packet.

16. The method of claim 9 wherein scanning the wireless channel comprises scanning the wireless channel for transmission capability over a distributed-coordination-function interframe spacing time period after the transmission time for the virtual packet.

17. The method of claim 9 wherein scanning the wireless channel comprises:

scanning a first wireless channel of a first wireless local area network for a first transmission capability for the sequence of virtual packets;

wherein incrementing the transmission counter comprises:

if the transmission capability indicates that the first wireless channel is busy at the transmission time of a packet of the sequence of virtual packets, then incrementing a first transmission counter for the first wireless local area network; and if the transmission capability indicates that the second wireless channel is busy at the transmission time of a packet of the sequence of virtual packets, then incrementing a second transmission counter for the second wireless local area network; and wherein reporting the transmission counter comprises:

comparing the first and second transmission counters; and selecting the first wireless local area network or the second wireless local area network based on the comparison.

* * * * *